United States Patent
Dionne et al.

(10) Patent No.: US 10,535,187 B2
(45) Date of Patent: Jan. 14, 2020

(54) VOXELIZATION TECHNIQUES

(71) Applicant: AUTODESK, INC., San Rafael, CA (US)

(72) Inventors: Olivier Dionne, Montreal (CA); Martin De Lasa, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 83 days.

(21) Appl. No.: 14/252,399

(22) Filed: Apr. 14, 2014

(65) Prior Publication Data

US 2014/0306955 A1   Oct. 16, 2014
US 2015/0279091 A9   Oct. 1, 2015

Related U.S. Application Data

(63) Continuation of application No. 14/251,522, filed on Apr. 11, 2014, now Pat. No. 9,836,879.

(60) Provisional application No. 61/812,699, filed on Apr. 16, 2013.

(51) Int. Cl.
*G06T 17/00* (2006.01)
*G06T 15/04* (2011.01)

(52) U.S. Cl.
CPC .............. *G06T 17/00* (2013.01); *G06T 15/04* (2013.01)

(58) Field of Classification Search
None
See application file for complete search history.

(56) References Cited

U.S. PATENT DOCUMENTS

| | | | | |
|---|---|---|---|---|
| 5,898,437 A * | 4/1999 | Deolaliker | ............. | G06T 15/40 345/421 |
| 6,115,050 A * | 9/2000 | Landau | ................. | G06T 15/503 345/619 |
| 6,256,036 B1 * | 7/2001 | Matsumoto | ............. | G06T 17/10 345/419 |
| 6,384,822 B1 * | 5/2002 | Bilodeau | ............... | G06T 15/405 345/422 |
| 6,556,199 B1 * | 4/2003 | Fang | ....................... | G06T 15/08 345/424 |
| 6,700,584 B1 * | 3/2004 | Wood | ...................... | G06T 15/50 345/422 |
| 8,448,067 B2 * | 5/2013 | Cerny | ................. | G06F 11/3612 715/719 |
| 8,493,383 B1 * | 7/2013 | Cook | ...................... | G06T 15/06 345/419 |
| 9,092,888 B1 * | 7/2015 | Gardiner | ................. | G06T 17/00 |
| 2003/0179196 A1 * | 9/2003 | Hux | ........................ | G06T 17/00 345/424 |
| 2004/0070582 A1 * | 4/2004 | Smith | .................. | A61B 8/4254 345/419 |
| 2005/0122338 A1 * | 6/2005 | Hong | .................... | G06T 15/405 345/546 |

(Continued)

*Primary Examiner* — Anh-Tuan V Nguyen
(74) *Attorney, Agent, or Firm* — Artegis Law Group, LLP

(57) ABSTRACT

A computer-implemented method for classifying voxels. The method includes rendering a plurality of images associated with a three-dimensional model. The method also includes identifying one or more pixels associated with the plurality of images that correspond to a voxel. The method further includes classifying the voxel as either external to the three-dimensional model or internal to the three-dimensional model based on the one or more pixels.

22 Claims, 6 Drawing Sheets

(56) References Cited

U.S. PATENT DOCUMENTS

| | | | | |
|---|---|---|---|---|
| 2005/0128195 A1* | 6/2005 | Houston | G06T 15/06 | 345/419 |
| 2005/0219239 A1* | 10/2005 | Mashitani | H04N 13/0003 | 345/419 |
| 2006/0044310 A1* | 3/2006 | Hong | G06T 7/0012 | 345/424 |
| 2006/0253021 A1* | 11/2006 | Aharon | A61B 5/055 | 600/416 |
| 2006/0290695 A1* | 12/2006 | Salomie | G06T 17/20 | 345/420 |
| 2007/0064002 A1* | 3/2007 | Xue | G06T 15/08 | 345/426 |
| 2007/0071312 A1* | 3/2007 | Gardella | G06T 11/40 | 382/154 |
| 2007/0165026 A1* | 7/2007 | Engel | G06T 15/08 | 345/424 |
| 2007/0216680 A1* | 9/2007 | Wang | G06T 15/04 | 345/424 |
| 2007/0247459 A1* | 10/2007 | Li | G06T 15/08 | 345/424 |
| 2008/0123895 A1* | 5/2008 | Gable | G06T 7/136 | 382/100 |
| 2008/0238919 A1* | 10/2008 | Pack | G06T 15/04 | 345/420 |
| 2009/0016588 A1* | 1/2009 | Slabaugh | G06K 9/342 | 382/131 |
| 2009/0195555 A1* | 8/2009 | Nystad | G09G 5/363 | 345/620 |
| 2009/0244065 A1* | 10/2009 | Storti | G06K 9/342 | 345/420 |
| 2010/0033482 A1* | 2/2010 | Zhou | G06T 15/06 | 345/424 |
| 2010/0183217 A1* | 7/2010 | Seung | G06K 9/342 | 382/156 |
| 2010/0194750 A1* | 8/2010 | Mielekamp | G06T 19/00 | 345/424 |
| 2010/0220907 A1* | 9/2010 | Dam | G06K 9/34 | 382/131 |
| 2010/0231583 A1* | 9/2010 | Furukawa | G01B 11/24 | 345/419 |
| 2011/0285736 A1* | 11/2011 | Kilgard | G06T 11/203 | 345/584 |
| 2012/0001909 A1* | 1/2012 | Garg | G06T 17/20 | 345/423 |
| 2012/0128218 A1* | 5/2012 | Amyot | G06T 19/00 | 382/128 |
| 2012/0155733 A1* | 6/2012 | Wagenknecht | G06T 7/0081 | 382/131 |
| 2012/0293514 A1* | 11/2012 | Virtue | G06T 7/0097 | 345/424 |
| 2013/0155058 A1* | 6/2013 | Golparvar-Fard | G06T 19/006 | 345/419 |
| 2013/0156280 A1* | 6/2013 | Kadir | G06T 7/0012 | 382/128 |
| 2013/0169638 A1* | 7/2013 | Carbonera | G06T 17/00 | 345/424 |
| 2013/0176312 A1* | 7/2013 | Schouwenburg | G06K 15/025 | 345/424 |
| 2013/0250050 A1* | 9/2013 | Kanaujia | H04N 13/0007 | 348/42 |
| 2014/0168222 A1* | 6/2014 | Bolz | G06T 11/40 | 345/441 |
| 2014/0247977 A1* | 9/2014 | Han | G06K 9/34 | 382/159 |

* cited by examiner

VOXELIZATION TECHNIQUES

CROSS-REFERENCE TO RELATED APPLICATIONS

This application is a continuation of the U.S. patent application titled "VOXELIZATION TECHNIQUES," filed on Apr. 11, 2014 and having Ser. No. 14/251,522. This related non-provisional application claims the priority benefit of the U.S. provisional application filed on Apr. 16, 2013 and having Ser. No. 61/812,699. The subject matter of both the related non-provisional application and the related provisional application is hereby incorporated herein by reference.

BACKGROUND OF THE INVENTION

Field of the Invention

The present invention relates generally to computer aided design (CAD) applications and, in particular, to various voxelization techniques.

Description of the Related Art

Three-dimensional modeling is a large field that includes techniques for generating, analyzing, and manipulating three-dimensional models for scientific, educational, and entertainment purposes. Oftentimes, analysis of three-dimensional models requires a "voxelization" of that three-dimensional model.

Voxelization is a technique for representing a particular three-dimensional shape as a collection of voxels, where voxels are subdivisions of three-dimensional space. Voxelization generally involves determining which voxels in a particular volume are considered to be occupied by a three-dimensional model, and which voxels in the volume are considered to be not occupied by (or "external to") the three-dimensional model.

Many techniques for voxelization exist; however, most of these techniques suffer from several drawbacks. Generally, these drawbacks include requiring the three-dimensional model that is analyzed to have certain characteristics, such as comprising closed, "watertight," non-overlapping, geometry. Many three-dimensional models produced for commercial use do not have these properties. Altering models to have these properties generally represents additional time that must be spent by a model designer.

As the foregoing illustrates, what is needed in the art are improved techniques for voxelizing a three-dimensional model.

SUMMARY OF THE INVENTION

One embodiment of the invention includes a computer-implemented method for classifying voxels. The method includes rendering a plurality of images associated with a three-dimensional model. The method also includes identifying one or more pixels associated with the plurality of images that correspond to a voxel. The method further includes classifying the voxel as either external to the three-dimensional model or internal to the three-dimensional model based on the one or more pixels.

One advantage of the disclosed techniques is that application 150 automatically generates a solid voxelization of a three-dimensional model, which reduces or eliminates the need for manual generation of a voxelization, thus improving design efficiency. Another advantage is that application 150 generates the voxelization even with a three-dimensional model that does not have closed, watertight non-overlapping geometry. Because these limitations are not present, designers have fewer constraints for model generation, which increases design efficiency.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
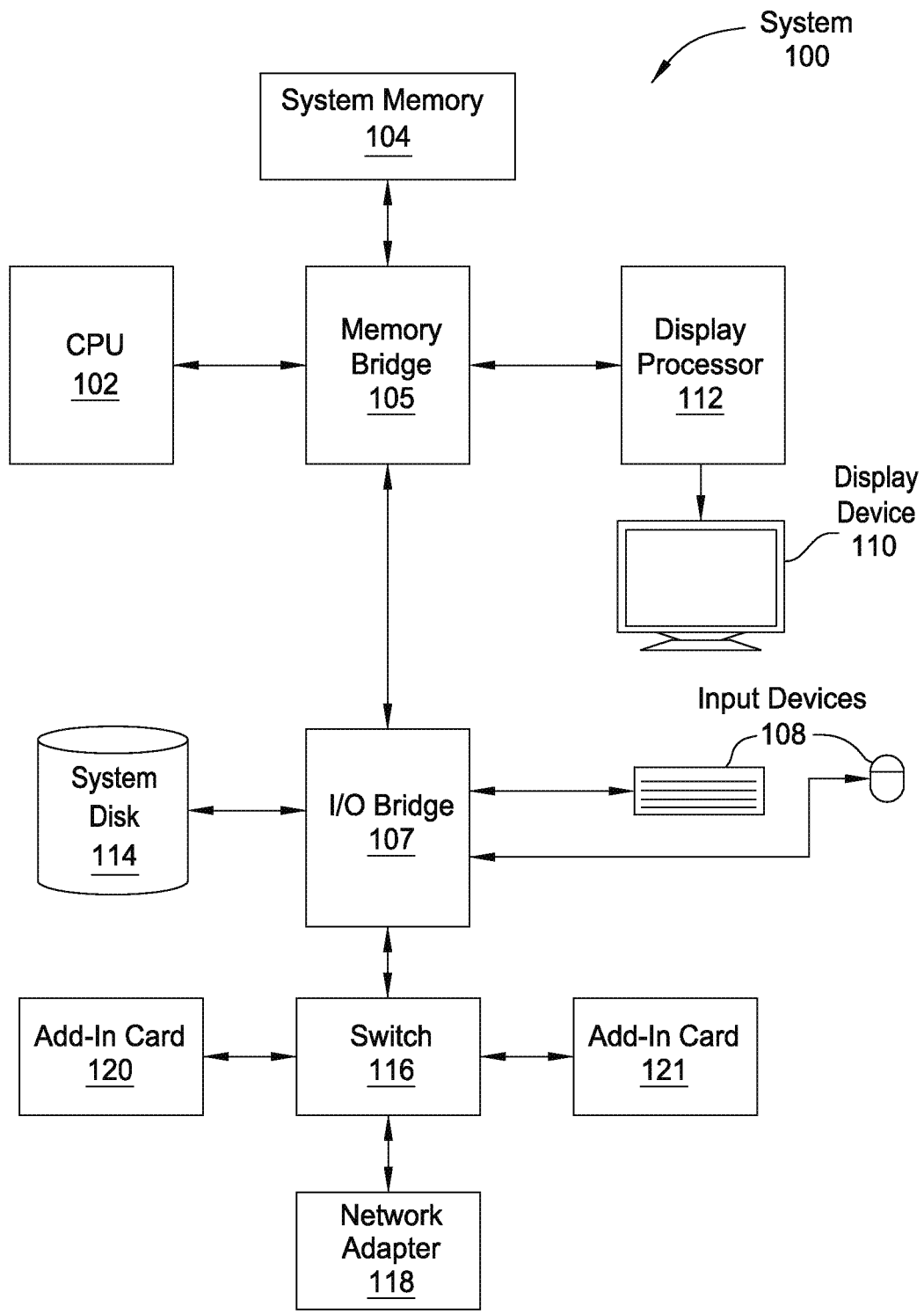
FIG. 1 is a block diagram of a system configured to implement one or more aspects of the present invention.

FIG. 1 is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (nor shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the CPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 is configured to accept user input for generating and modifying a three-dimensional model, and to perform certain processing techniques on the three-dimensional model.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Voxelization Techniques

Figure 2A:
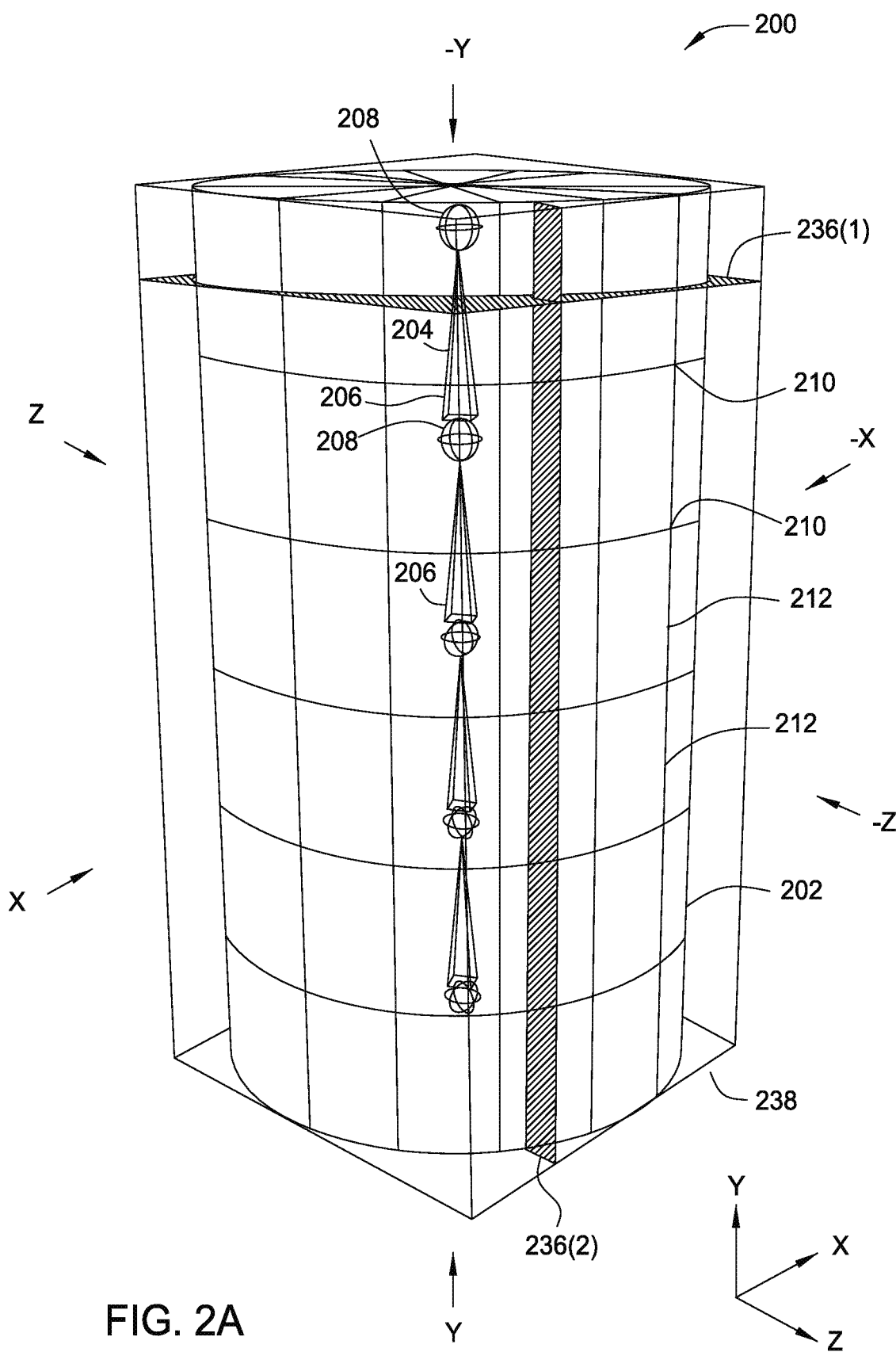
FIG. 2A is an illustration of a geometry model, according to one embodiment of the present invention.

FIG. 2A is an illustration of a geometry model 200, according to one embodiment of the present invention. As shown, the geometry model 200 includes a skin 202 and a transformation hierarchy 204 that is bound to the skin. The skin 202 is a mesh that includes vertices 210 and edges 212 that together define the mesh. The transformation hierarchy 204 is a hierarchy of influences 206 that may each influence the motion of vertices 210 within skin 202 during animation of the geometry model 200, as is generally known. In some embodiments, the transformation hierarchy 204 is a skeleton 204 that includes bones 206 and joints 208. In other embodiments, the transformation hierarchy 204 includes other types of influences, such as points, spheres, capsules, and other types of influences, as is generally known. The skin 202 is bound to the transformation hierarchy 204 so that movement of influences 206 in the transformation hierarchy 204 causes deformation of the skin 202. The skin occupies a bounding box 238 whose limits are defined by the maximum extent of the skin 202 in three orthogonal directions (x, y, and z). For purposes of illustration, the model 200 is a cylinder, which has simple geometry. However, those of skill in the art will understand that the techniques described herein can be applied to any geometry model. Further, in some embodiments, the geometry model 200 does not include the transformation hierarchy 204 of influences 206.

Classifying Voxels of a Solid Voxelization

To classify voxels of a solid voxelization, application 150 begins with a voxelization of a particular volume. A voxelization is a subdivision into individual voxels of a volume defined by the bounding box 238 that surrounds the skin 202. In some embodiments, the voxelization is a uniform voxelization in which all voxels are the same size. In other embodiments, the voxelization is a non-uniform sparse voxelization, in which all voxels are not the same size.

For a uniform voxelization, application 150 creates or receives a uniform subdivision of the volume based on a chosen resolution. For example, if the resolution is 10×10×20, then application 150 would divide the bounding box 238 into 2,000 voxels—10 wide, by 10 deep, by 20 high.

For sparse voxelization, application 150 receives or generates an octree. The octree includes voxels of different sizes. To generate an octree, a volume is recursively subdivided into eighths to generate a hierarchical "tree" of progressively smaller-sized voxels. Voxels of different sizes are chosen for inclusion into the octree based on the shape of the skin 202 and influences 206. The smallest voxels are chosen for inclusion in the octree where such voxels intersect either the skin 202 or an influence 206. For all other spaces, the largest voxel size is chosen that does not intersect an already-chosen voxel, the skin 202, or an influence 206. The result of this technique is a sparse voxelization in which for any space within or without the skin 202, the largest sized voxel that occupies that space exists in the octree, and for the skin 202 and the influences 206, the smallest size voxel that intersects with the skin 202 and influences 206 exists in the octree. An octree may be generated as described through techniques that are generally known in the art, including techniques that are based on the separating-axis theorem.

Once application 150 obtains the voxelization, application 150 performs rendering operations to classify voxels in the voxelization as either interior to the skin 202 or exterior to the skin 202. These rendering operations are now described.

Figure 2B:
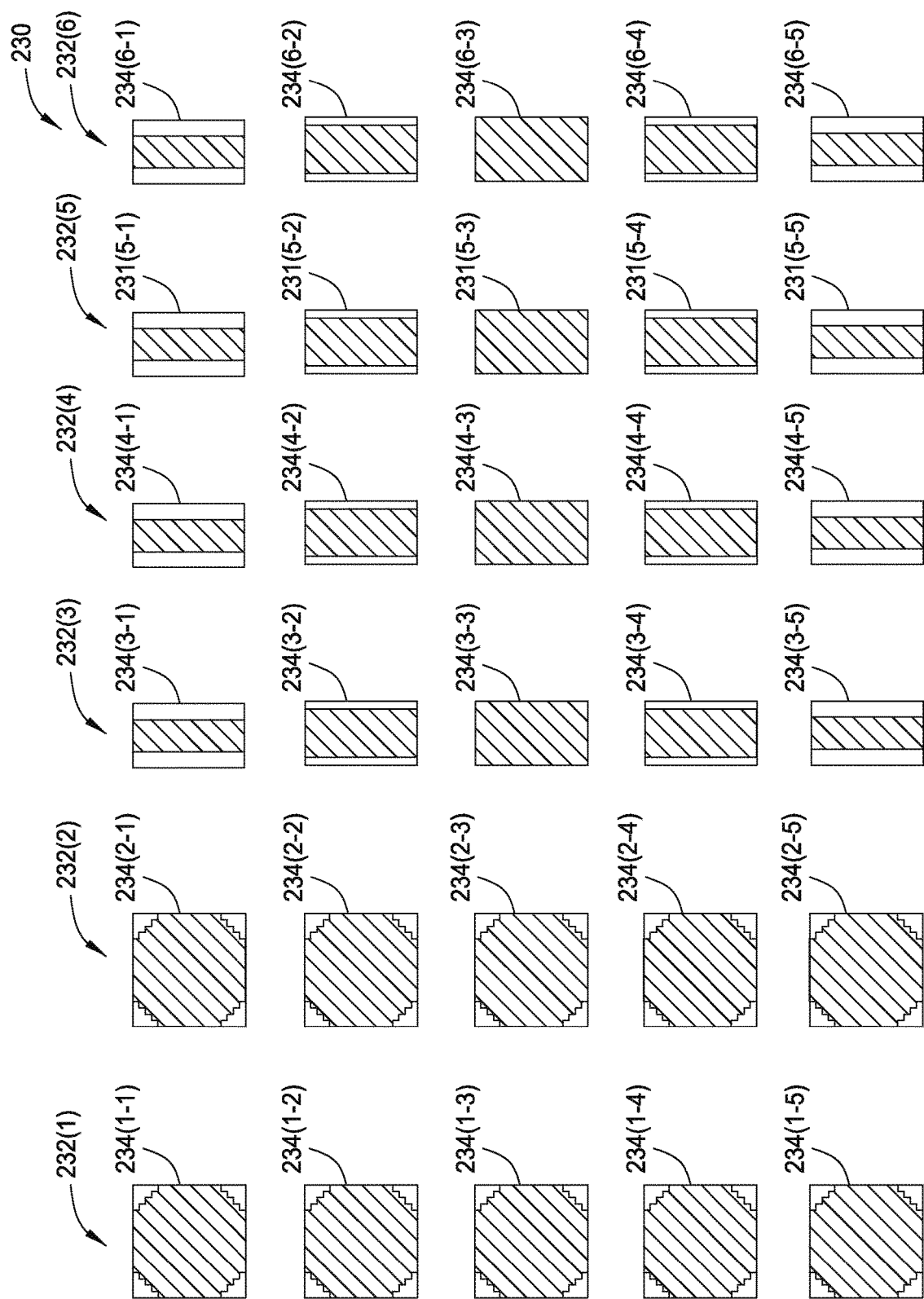
FIG. 2B illustrates different rendered images that are generated for classifying the voxels included in a solid voxelization of the geometry model of FIG. 2A, according to one embodiment of the present invention.

FIG. 2B illustrates different rendered images that are generated for classifying the voxels included in a solid voxelization of the geometry model 200 of FIG. 2A, according to one embodiment of the present invention. As shown, chart 230 includes different sets 232 of different rendered images 234 of the geometry model 200.

To generate the rendered images 234, application 150 renders cross-sections of the model 200 in several different directions and at different slice depths. For each cross-section, application 150, sets a near clip plane to a particular slice depth, sets a far clip plane to at least as far away as the furthest extent of the model 200, and renders a two-color image of the geometry model. A first color for a particular pixel indicates that a back face of a primitive is visible at the pixel and a second color for a particular pixel indicates that a front face of a primitive is visible at the pixel or that no primitive is visible.

Application 150 renders images 234 of the model 200 from three different directions that are orthogonal to one another (e.g., dimensions x, y, and z), and from two opposing viewpoints for each direction, for a total of six different directions. Chart 230 illustrates different sets 232 of different images 234 rendered at different slice depths for these six different directions. Each set 232 is associated with a different direction.

In the example illustrated in FIG. 2B, a first set 232(1) represents images 234 rendered at different slice depths from a direction denoted as "−y" in FIG. 2A, More specifically, each image 234 in the first set 232(1) is generated by rendering in the direction denoted as "−y" and rendering with a near dip plane set to a particular slice depth. For example, the image 234(1-1) is rendered by setting the near dip plane to the slice depth represented by plane 236(1), and rendering in the "−y" direction (downwards in FIG. 2A). Because the polygons at the bottom of the cylinder face outwards (downwards in FIG. 2A), back faces of those polygons are visible from the "−y" direction. Thus, rendering in the "−y" direction generates pixels of the first color for those polygons. All other pixels in the image are the second color, as no polygons are visible outside of the polygons that represent the bottom of the cylinder. The walls of the cylinder are not visible because they align with the direction of the render. The top wall of the cylinder is not visible because the top wall is in front of the near dip plane.

Set 232(2) includes images 234 rendered from the "y" direction, which is opposite to the "−y" direction. Because the model 200 is a cylinder, which is symmetric, the images 234 included in set 232(2) are similar to the images 234 included in set 232(1). Set 232(3) includes images 234 rendered from the "−x" direction, set 232(4) includes images 234 rendered from the "x" direction, set 232(5) includes images 234 rendered from the "−z" direction, and set 232(6) includes images 234 rendered from the "z" direction. For set 232(3), the images 234 are rendered at different slice depths in the "−x" direction. Image 234(3-1) represents an image where the near clip plane is set to the plane 236(2), and the image 234(3-1) is rendered in the "x" direction. Viewed from this position, a narrow strip of pixels in the center of the image 234(3-1) are rendered as the first color, because back faces of primitives at the far end of the model 200 are visible. All other pixels are rendered as the second color, because front faces of primitives in the cylinder are visible for those pixels. Again, because the cylinder is symmetric, the images in set 232(4), set 232(5), and set 232(6) are the same. However, if the model 200 were not symmetric, then the images in the different sets 232 may vary.

Once the images 234 are rendered, application 150 classifies the voxels based on the images 234. More specifically, application 150 classifies the voxels in the voxelization as either internal or external to the skin 202 based on a voting technique. The voting technique examines pixels from the rendered images 234 and classifies voxels associated with pixels in those images 234 as either internal or external based on the color of those pixels. More specifically, for each voxel, application 150 identifies pixels in one image 234 in each of the six image sets 232 that correspond to the voxel. Once identified, application 150 applies a voting operation based on the color of the six pixels.

To identify the pixels, application 150 examines the coordinates of the different pixels in the six image sets 232 as compared with the coordinates of the voxel. Each voxel has a set of coordinates that defines the location of the voxel in three-dimensional space. Similarly, each pixel in each image 234 has a set of coordinates that defines the location of that pixel in three-dimensional space. The coordinates of these pixels include three dimensions because each pixel is associated with a particular slice depth at which the image 234 that includes the pixel is rendered. For example, one pixel in an image 234 rendered from the x direction at a particular slice depth, may have (y, z) coordinates of 1,1. That pixel would have an x coordinate corresponding to the slice depth at which the image 234 is rendered. In one example, the slice depth has a value of 1. The corresponding pixel would have (x, y, z) coordinates of 1, 1, 1. For a voxel having coordinates of 1, 1, 1, application 150 would identify all pixels in six images that have the coordinates of 1, 1, 1.

To classify a voxel, application 150 examines six pixels from six different images 234 corresponding to the coordinates of the voxel. For each dimension (x, y, and z), application 150 evaluates that dimension based on two pixels from the two images rendered for that dimension (for example, the x, −x images, the y, −y images, or the z, −z images). If either of those two pixels are of the second color (which indicates the back face of a pixel), then that dimension is evaluated as "interior." If two or more dimensions are evaluated as "interior" for a particular voxel, then the voxel is classified as interior. If zero dimensions are evaluated as "interior," then the voxel is classified as exterior. In one embodiment, if only one dimension is evaluated as interior, then the voxel is classified as exterior. In another embodiment, if only one dimension is evaluated as interior, then application 150 performs techniques for calculating winding numbers for the voxel in order to classify the voxel. Techniques related to winding numbers are generally well-known in the art. These techniques can produce accurate voxel classification results, but are computationally intensive, which means that applying winding numbers to each voxel in a particular volume would consume a large amount of processing power. However, the techniques for winding numbers may be applied to classify "hard-to-classify" voxels. The result of the classification operations described above is a classification for each of the voxels in the volume. In some embodiments, application 150 performs techniques other than those related to winding numbers to classify the "hard-to-classify" voxels.

The following pseudo-code is an example implementation for the above-described techniques for classifying voxels:

$v_{i(x, -x)}: \{0, 1\} \to v_{ix} \| v_{i-x}$
$v_{i(y, -y)}: \{0, 1\} \to v_{iy} \| v_{i-y}$
$v_{i(z, -z)}: \{0, 1\} \to v_{iz} \| v_{i-z}$

The three $v_i$ variables are variables for each of the different dimensions (e.g., $v_{i(x, -x)}$ is a value for the x direction). Each line of the pseudo-code presented above assigns a value to a particular dimension. The value is the logical OR of the two vote values associated with a particular dimension. Thus, the pseudo-code assigns a value of "1" to a dimension if either of the vote values for that dimension are "1" and "0" otherwise. After assigning values for all dimensions, the following pseudo-code is applied:

$v_i: \{0, 1\} \to (v_{i(x, -x)} + v_{i(y, -y)} + v_{i(z, -z)}) > 1$

With the pseudo-code provided above, the value for any particular voxel $v_i$ is set to "1" if at least two of the corresponding dimension values are "1" and to "0" otherwise. The value of "1" corresponds to the second color described above while the value of "0" corresponds to the first color described above.

For the non-uniform, sparse voxelization, application 150 performs the above-described steps for the uniform voxelization, but also applies a hierarchical classification technique. The hierarchical classification technique involves examining each level in the octree hierarchy, and, at each level, classifying voxels in that level based on whether voxels in a higher-resolution level are classified as internal.

More specifically, the highest resolution level is classified as with the uniform voxelization described above. For a voxel in the next lower resolution level, if any voxel in the highest resolution level that occupies the same area as the voxel in the next lower resolution level is classified as internal, then the voxel in the next lower resolution level is also classified as internal. This hierarchical procedure continues until all voxels in all levels are classified. After all voxels in each level of the hierarchy are classified, the voxels in the octree are classified. More specifically, each voxel in the octree has a size that corresponds to a size of voxels of one of the levels of the hierarchy. Thus, for any particular voxel in the octree, application 150 assigns that voxel with a classification that is equivalent to the classification of a voxel in the level in the hierarchy whose voxel size matches the voxel size of that particular voxel. After all voxels in the octree are classified, application 150 may discard the information included in the hierarchy, as the necessary information is already included in the octree.

The following pseudo-code provides an example algorithm for classifying voxels in an octree.

TABLE 1

Classifying voxels of a sparse voxelization in: Uniform voxelization U with resolution r, octree O
out: Sparse voxelization V 1:  $S = \begin{vmatrix} -1 & 1 & -1 & 1 & -1 & 1 & -1 & 1 \\ -1 & -1 & 1 & 1 & -1 & -1 & 1 & 1 \\ -1 & -1 & -1 & -1 & 1 & 1 & 1 & 1 \end{vmatrix}$
2:  n = log₂(r)
3:  $G_n$ = U
    // Compute lower resolution grids
4:  for i = n − 1 to 0 do
        // Create lower resolution grid
5:      $G_i$ = createGrid($2^i$)
        // Compute high resolution grid offsets
6:      O = $S/2^{i+2}$
        // Fill lower resolution grid
7:      foreach voxel $v_j$ of $G_i$ do
8:          $p_j$ = voxelCenter($v_j$)
9:          for k = 0 to 7 do
10:             $p_k = p_j + O(:,k)$
11:             if voxelAt($p_k, G_{i+1}$) is not exterior
                    then
12:                 $v_j$ = interior
13:                 break
14:             end
15:         end
16:     end
17: end
    // Populate V by traversing octree
18: foreach leaf l of O do
19:     p = octantCenter(l)
20:     d = octantDepth(l)
21:     v = voxelAt(p, $G_d$)
22:     if v is not exterior then
23:         Push v to V
24:     end
25: end This algorithm begins by creating log₂(r) representations of the uniform voxelization at different scales $G_n, \ldots, G_0$, where $G_n$=U (lines 2-3), and where U is the uniform voxelization at the highest resolution. Each $G_i$ contains voxels of the same size as each other to be tagged as either interior or exterior. At each resolution i from (n−1) to 0, all voxels in $G_i$ are initialized as exterior (line 5). Offsets O corresponding to the voxel half-width at the higher resolution level i+1 are computed (line 6). The offsets are calculated based on S, which is a matrix that includes eight different directions. These directions extend from the center of a voxel of a particular size to the center of voxels of the next smaller size that occupy the space of the voxel of the larger size. S is simply a helper value that allows for quick calculation of offset O.

For each voxel $v_j$ of $G_i$, the algorithm tests whether any embedded voxels from $G_{i+1}$ are interior to the mesh 202. For each voxel $v_j$, the class of voxels at position $p_k=p_j+O$ (:,k) in $G_{i+1}$ are checked. $p_j$ is the position of the center of voxel $v_j$ and $O(:,k)$ is the $k^{th}$ column of O. If at least one of the eight higher resolution voxels is tagged as non-exterior then $v_j$ is marked as interior (lines 11-14). This technique is repeated for all levels of $G_i$.

Once classifications for all voxels in the different levels of $G_i$ are completed, the voxels in the octree are assigned classifications based on the classifications stored in the levels $G_i$ (lines 18-25). More specifically, a voxelization V is generated by selecting voxels from the levels $G_i$ for each leaf in the octree (where a leaf is a non-uniform voxel included in the octree). For each leaf, an appropriate voxel from an appropriate level $G_i$ is chosen based on the size of the voxel corresponding to the leaf. More specifically, a voxel from a level $G_i$ having voxels of the same size as the leaf is chose in order to assign a classification to the leaf of the octree. The result of this procedure is a sparse voxelization that includes all of the leaves of the octree, each of which is classified as either external or internal.

Figure 3A:
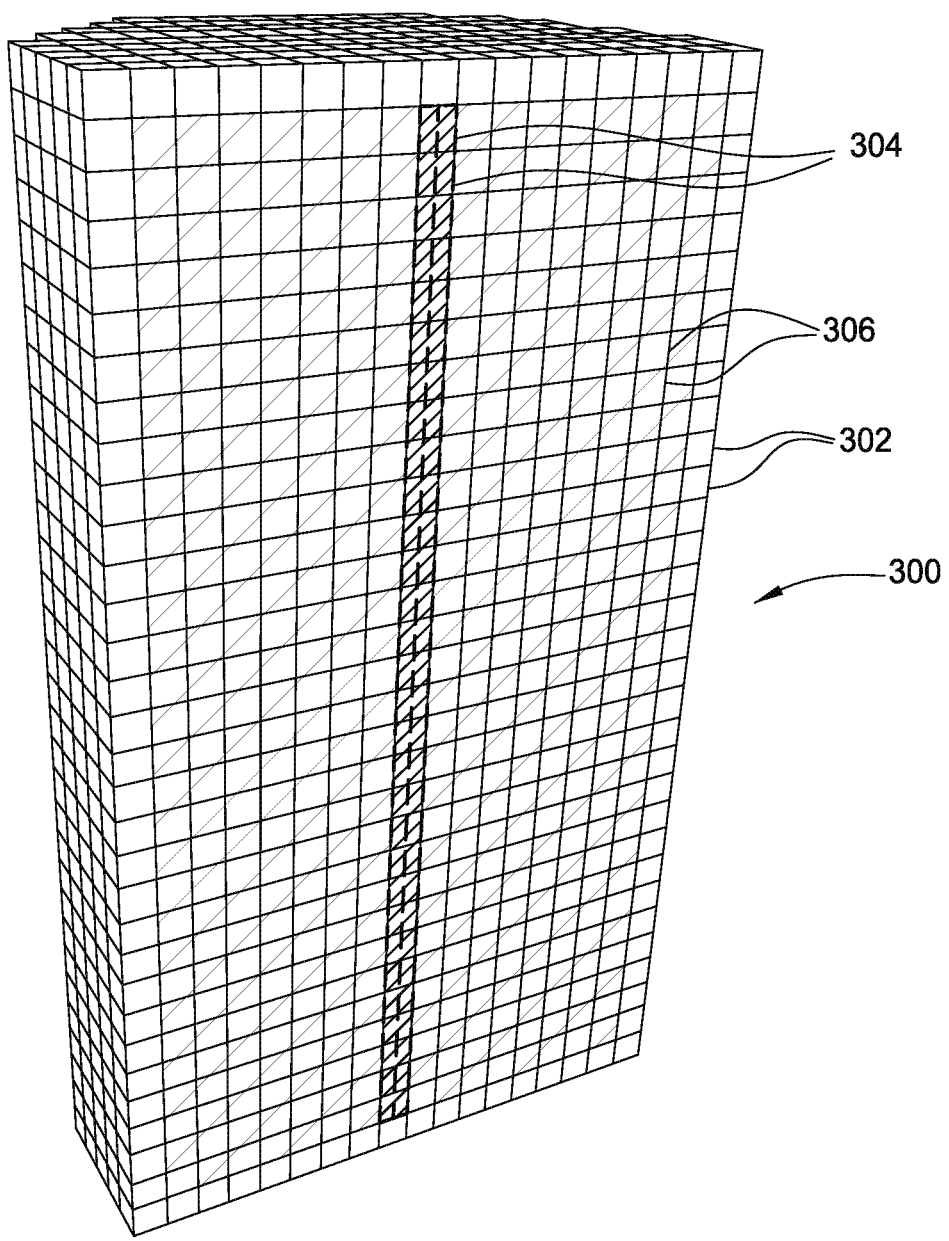
FIG. 3A is an illustration of a uniform voxelization of the geometry model of FIG. 2A, according to one embodiment of the present invention.

FIG. 3A is an illustration of a uniform voxelization 300 of the geometry model 200 of FIG. 2A, according to one embodiment of the present invention. As shown, the uniform voxelization includes internal voxels 306, which include influencer voxels 304, and boundary voxels 302, as well as other internal voxels 306. For clarity, external voxels are not depicted in FIG. 3A.

Because the voxelization 300 is uniform, all voxels within the voxelization 300 are the same size. By following the procedures described above regarding the manner in which to generate a voxelization 300 and classify voxels in the voxelization 300, the internal voxels 306 are identified. Boundary voxels 302 are voxels that intersect the skin 202 (FIG. 2A). Influencer voxels 304 are voxels that intersect influences 206 (FIG. 2A). Determining whether a particular voxel intersects a particular object (such as a vertex 210 or an influence 206) may be done with techniques known to those of skill in the art. For example, to test whether a point such as a vertex is within a voxel, the coordinates of the point are compared to the coordinates of the boundaries of the voxel. If the coordinates of the point are within the boundaries of the voxel in each dimension, then the point is considered to intersect the voxel.

Figure 3B:
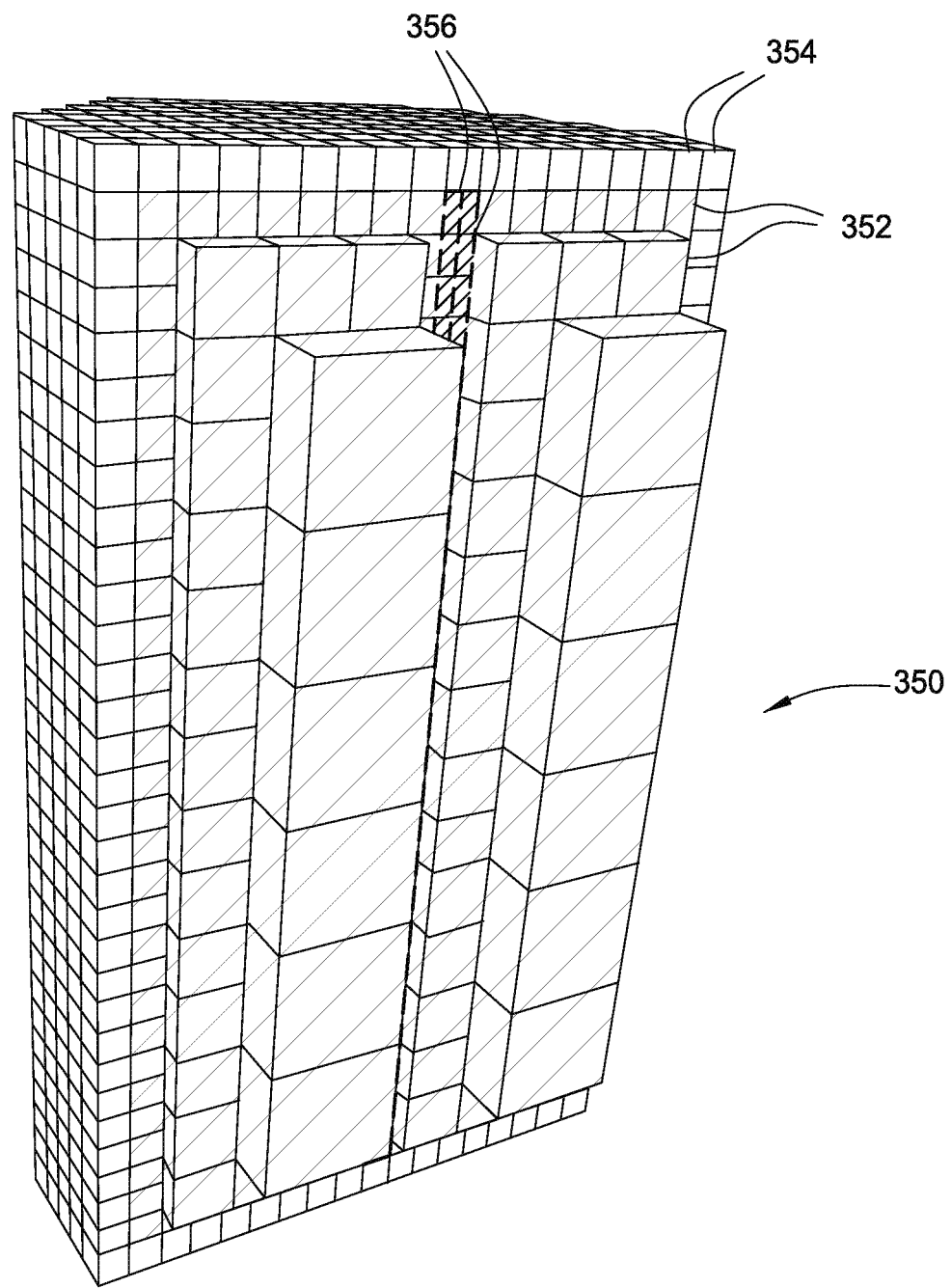
FIG. 3B is an illustration of a nonuniform, sparse voxelization of the geometry model of FIG. 2A, according to one embodiment of the present invention.

FIG. 3B is an illustration of a non-uniform, sparse voxelization 350 of the geometry model 200 of FIG. 2A, according to one embodiment of the present invention. As shown, the sparse voxelization 350 includes internal voxels 352, boundary voxels 354, and influencer voxels 356.

Because the voxelization is non-uniform, the voxels in the voxelization are different sizes. However, again, the techniques described above classify the non-uniform voxels in the voxelization 350 as internal or external. As described above, boundary voxels 354 are voxels that intersect with the skin 202 (FIG. 2A). Influencer voxels 356 are voxels that intersect the influences 206 (FIG. 2A).

Figure 4:
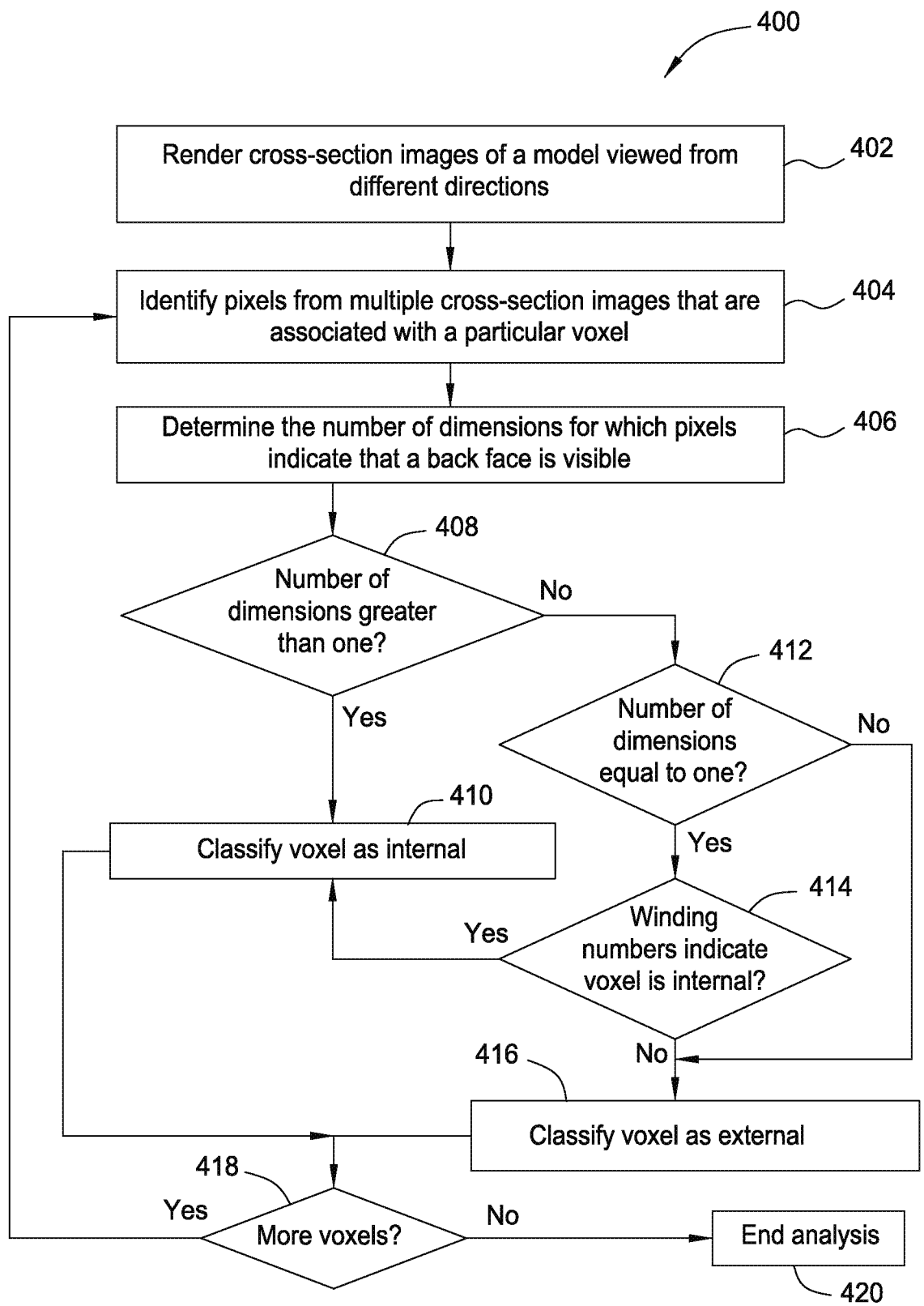
FIG. 4 is a flow diagram of method steps for classifying voxels as either internal or external, according to one embodiment of the present invention.

FIG. 4 is a flow diagram of method steps for classifying voxels as either internal or external, according to one embodiment of the present invention. Although the steps are described in conjunction with FIGS. 1-3B, persons skilled in the art will understand that any system configured to perform the method steps, in any order, falls within the scope of the present invention.

As shown, a method 400 begins in step 402, in which application 150 renders cross-section images of a model viewed from different directions, where a first color in a cross-section image indicates that a back face of a primitive is visible and a second color indicates that a front face is visible. In step 404, application 150 identifies pixels from multiple cross-section images that are associated with a particular voxel. In step 406, application 150 determines the number of dimensions for which pixels indicate that a back face is visible. In step 408, application determines whether the number of dimensions is greater than one. If the number of dimensions is greater than one, then the method proceeds to step 410. In step 410, application 150 classifies the voxel as internal. After step 410, the method proceeds to step 418.

If the number of dimensions is less than one, then the method proceeds to step 412. In step 412, application 150 determines whether the number of dimensions is equal to one. If the number of dimensions is equal to one, then the method proceeds to step 414. If the number of dimensions is not equal to one, then the method proceeds to step 416. In step 414, application 150 determines whether winding numbers indicate that the voxel is internal. If winding numbers indicate that the voxel is internal, then the method proceeds to step 410. If winding numbers indicate that the voxel is not internal, then the method proceeds to step 416. In step 416, application classifies the voxel as external.

In step 418, application 150 determines whether there are more voxels to examine. If there are more voxels to examine, then the method returns to step 404. If there are no more voxels to examine, then the method proceeds to step 420, in which application 150 ends analysis.

In sum, application 150 generates a voxelization of a 3D model by rendering slice images of the model from different directions and performing vote operations based on the slice images. More specifically, for each voxel, application 150 determines whether pixels for images rendered in two or more directions indicate that a back face of a primitive are visible, and if so, determine that the voxel is an interior voxel. If a pixel from only one direction indicates that a back face of a primitive are visible, then application may either determine that the voxel is exterior or apply winding numbers to determine whether the voxel is interior or exterior.

One advantage of the disclosed techniques is that application 150 automatically generates a solid voxelization of a three-dimensional model, which reduces or eliminates the need for manual generation of a voxelization, thus improving design efficiency. Another advantage is that application 150 generates the voxelization even with a three-dimensional model that does not have closed, watertight non-overlapping geometry. Because these limitations are not present, designers have fewer constraints for model generation, which increases design efficiency.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for classifying voxels, the method comprising:
   selecting a first slice depth and a second slice depth along a first dimension of a three-dimensional model;
   rendering a first two-dimensional image at the first slice depth;
   rendering a second two-dimensional image at the second slice depth,
   wherein, for each of a plurality of pixels included in the first two-dimensional image and the second two-dimensional image:
      a first color indicates that a back face of one or more graphics primitives included in the three-dimensional model is visible at the pixel, and
      a second color indicates that a front face of one or more graphics primitives included in the three-dimensional model is visible at the pixel;
   identifying, in the plurality of pixels:
      a first pixel included in the first two-dimensional image, and
      a second pixel included in the second two-dimensional image,
      wherein each of the first pixel and the second pixel corresponds to a first voxel; and
   classifying the first voxel as either external to the three-dimensional model or internal to the three-dimensional model based on the first pixel and the second pixel having one of the first color and the second color.

2. The computer-implemented method of claim 1, further comprising:
   rendering the first two-dimensional image and the second two-dimensional image with respect to the first dimension,
   rendering a third two-dimensional image and a fourth two-dimensional image with respect to a second dimension, and
   rendering a fifth two-dimensional image and a sixth two-dimensional image with respect to a third dimension,
   wherein the first two-dimensional image, the second two-dimensional image, the third two-dimensional image, the fourth two-dimensional image, the fifth two-dimensional image, and the sixth two-dimensional image are included in a plurality of images.

3. The computer-implemented method of claim 2, wherein the first dimension is orthogonal to the second dimension and the third dimension is orthogonal to both the first dimension and the second dimension.

4. The computer-implemented method of claim 1, wherein identifying the first pixel and the second pixel comprises identifying, in a plurality of images that includes the first two-dimensional image and the second two-dimension image, a first pixel set that includes at least six pixels that have coordinates corresponding to coordinates of the first voxel.

5. The computer-implemented method of claim 1, wherein classifying the first voxel comprises:
   determining that the first pixel and the second pixel have the first color, and,
   in response, classifying the first voxel as internal.

6. The computer-implemented method of claim 1, further comprising dividing a volume corresponding to the three-dimensional model into an octree that includes a plurality of non-uniform voxels that includes the first voxel.

7. The computer-implemented method of claim 6, further comprising:
   generating a first voxel grid having a first resolution;
   generating a second voxel grid having a second resolution that is lower than the first resolution,
   classifying one or more voxels in the first voxel grid as internal, and
   classifying one or more voxels in the second voxel grid as internal based on classifying the one or more voxels in the first voxel grid as internal,
   wherein the one or more voxels in the first voxel grid that are classified as internal are located within the same volume as the one or more voxels in the second voxel grid that are classified as internal.

8. The computer-implemented method of claim 1, wherein rendering the first two-dimensional image at the first slice depth comprises:
   selecting a first pixel to render at the first slice depth;
   if the first pixel includes the back face of the one or more graphics primitives, rendering the first pixel with the first color; and
   if the first pixel includes the front face of the one or more graphics primitives, rendering the first pixel with the second color.

9. The computer-implemented method of claim 8, wherein rendering the second two-dimensional image at the second slice depth comprises:
   selecting a second pixel to render at the second slice depth;
   if the second pixel includes the back face of the one or more graphics primitives, rendering the second pixel with the first color; and
   if the second pixel includes the front face of the one or more graphics primitives, rendering the second pixel with the second color in a plurality of colors.

10. The computer-implemented method of claim 1, wherein selecting the first slice depth comprises:
    setting a near clip plane, wherein the near clip plane is located along the first dimension and within the three-dimensional model; and
    setting a far clip plane, wherein the far clip plane is located along the first dimension and at least as far away from a cross section as a boundary of the three-dimensional model,
    wherein rendering the first two-dimensional image comprises generating a two-dimensional, two-color image of a portion of the three-dimensional model between the near clip plane and the far clip plane.

11. A computing device for classifying voxels, the computing device comprising:
    a memory storing instructions; and
    a processor that is coupled to memory that executes the instructions to:
       select a first slice depth and a second slice depth along a first dimension of a three-dimensional model;
       render a first two-dimensional image at the first slice depth;
       render a second two-dimensional image at the second slice depth,
       wherein, for each of a plurality of pixels included in the first two-dimensional image and the second two-dimensional image:
          a first color indicates that a back face of one or more graphics primitives included in the three-dimensional model is visible at the pixel, and a second color indicates that a front face of one or more graphics primitives included in the three-dimensional model is visible at the pixel;

identify, in the plurality of pixels:
  a first pixel included in the first two-dimensional image, and
  a second pixel included in the second two-dimensional image,
  wherein each of the first pixel and the second pixel corresponds to a first voxel; and
classify the first voxel as either external to the three-dimensional model or internal to the three-dimensional model based on the first pixel and the second pixel having one of the first color and the second color.

12. The computing device of claim 11, wherein the processor further executes the instructions to:
  render the first two-dimensional image and the second two-dimensional image with respect to the first dimension,
  render a third two-dimensional image and a fourth two-dimensional image with respect to a second dimension, and
  render a fifth image two-dimensional and a sixth two-dimensional image with respect to a third dimension,
  wherein the first two-dimensional image, the second two-dimensional image, the third two-dimensional image, the fourth two-dimensional image, the fifth two-dimensional image, and the sixth two-dimensional image are included in a plurality of images.

13. The computing device of claim 11, wherein the processor executes instructions to identify the first pixel and the second pixel by identifying, in a plurality of images that includes the first two-dimensional image and the second two-dimensional image, a first pixel set that includes at least six pixels that have coordinates corresponding to coordinates of the first voxel.

14. The computing device of claim 11, wherein the processor further executes the instructions to divide a volume corresponding to the three-dimensional model into an octree that includes a plurality of non-uniform voxels that includes the first voxel.

15. The computing device of claim 11, wherein the processor executes the instructions to render the first two-dimensional image at the first slice depth by:
  selecting a first pixel to render at the first slice depth;
  if the first pixel includes the back face of the one or more graphics primitives, rendering the first pixel with the first color; and
  if the first pixel includes the front face of the one or more graphics primitive, rendering the first pixel with the second color.

16. The computing device of claim 11, wherein rendering the second two-dimensional image at the second slice depth comprises:
  selecting a second pixel to render at the second slice depth;
  if the second pixel includes the back face of the one or more graphics primitives, rendering the second pixel with the first color; and
  if the second pixel includes the front face of the one or more graphics primitives, or no graphics primitives, render the second pixel with the second color.

17. One or more non-transitory computer-readable media storing instructions that, when executed by one or more processors, cause the one or more processors to perform the steps of:

selecting a first slice depth and a second slice depth along a first dimension of a three-dimensional model;
rendering a first two-dimensional image at the first slice depth;
rendering a second two-dimensional image at the second slice depth,
wherein, for each of a plurality of pixels included in the first two-dimensional image and the second two-dimensional image;
  a first color indicates that a back face of one or more graphics primitives included in the three-dimensional model is visible at the pixel, and
  a second color indicates that a front face of one or more graphics primitives included in the three-dimensional model is visible at the pixel;
identifying, in the plurality of pixels:
  a first pixel included in the first two-dimensional image, and
  a second pixel included in the second two-dimensional image,
  wherein each of the first pixel and the second pixel corresponds to a first voxel; and
classifying the first voxel as either external to the three-dimensional model or internal to the three-dimensional model based on the first pixel and the second pixel having one of the first color and the second color.

18. The one or more non-transitory computer-readable media of claim 17, further storing instructions that, when executed by the one or more processors, cause the one or more processors to perform the steps of:
  rendering the first two-dimensional image and the second two-dimensional image with respect to the first dimension,
  rendering a third two-dimensional image and a fourth two-dimensional image with respect to a second dimension, and
  rendering a fifth two-dimensional image and a sixth two-dimensional image with respect to a third dimension,
  wherein the first two-dimensional image, the second two-dimensional image, the third two-dimensional image, the fourth two-dimensional image, the fifth two-dimensional image, and the sixth two-dimensional image are included in a plurality of images.

19. The one or more non-transitory computer-readable media of claim 17, further storing instructions that, when executed by the one or more processors, cause the one or more processors to perform the step of identifying, in a plurality of images that includes the first two-dimensional image and the second two-dimensional image, a first pixel set that includes at least six pixels that have coordinates corresponding to coordinates of the first voxel.

20. The one or more non-transitory computer-readable media of claim 17, further storing instructions that, when executed by the one or more processors, cause the one or more processors to perform the step of dividing a volume corresponding to the three-dimensional model into an octree that includes a plurality of non-uniform voxels that includes the first voxel.

21. The one or more non-transitory computer-readable media of claim 17, wherein rendering the first two-dimensional image at the first slice depth comprises:
  selecting a first pixel to render at the first slice depth;
  if the first pixel includes the back face of the one or more graphics primitives, rendering the first pixel with the first color; and if the first pixel includes the front face of the one or more graphics primitives or no graphics primitives, rendering the first pixel with the second color.

22. The one or more non-transitory computer-readable media of claim 21, wherein rendering the second two-dimensional image at the second slice depth comprises:
  selecting a second pixel to render at the second slice depth;
  if the second pixel includes the back face of the one or more graphics primitives, rendering the second pixel with the first color; and
  if the second pixel includes the front face of the one or more graphics primitives or no graphics primitives, rendering the second pixel with the second color.

* * * * *